(12) United States Patent
Seo et al.

(10) Patent No.: US 6,203,213 B1
(45) Date of Patent: Mar. 20, 2001

(54) SPLICE MODULE FOR USE IN FIBER OPTIC CABLE ALIGNMENT AND SPLICING DEVICES

(75) Inventors: Sumio Seo; James Yanik, both of Asheville; John T. Lambert, Swannanoa, all of NC (US)

(73) Assignee: Superior Modular Products Incorporated, Swannanoa, NC (US)

( * ) Notice: Subject to any disclaimer, the term of this patent is extended or adjusted under 35 U.S.C. 154(b) by 0 days.

(21) Appl. No.: 09/270,264

(22) Filed: Mar. 15, 1999

(51) Int. Cl.[7] ................................................. G02B 6/255
(52) U.S. Cl. .......................... 385/96; 385/98; 385/95; 385/97
(58) Field of Search ............................. 385/96, 95, 97, 385/98, 99, 147, 135, 134, 136; 156/257, 258; 607/5; 439/82

(56) References Cited

U.S. PATENT DOCUMENTS

| | | | |
|---|---|---|---|
| 4,598,974 | * 7/1986 | Munn et al. | 385/95 X |
| 5,002,351 | 3/1991 | Szanto et al. | 385/95 X |
| 5,146,527 | 9/1992 | Mallinson | 385/98 |
| 5,222,171 | 6/1993 | Straus | 385/96 |
| 5,582,671 | 12/1996 | Harman et al. | 156/257 |
| 5,717,813 | 2/1998 | Harman et al. | 385/147 |
| 5,740,301 | 4/1998 | Harman et al. | 385/147 |

* cited by examiner

*Primary Examiner*—Phan T. H. Palmer
(74) *Attorney, Agent, or Firm*—Carter & Schnedler, P.A.

(57) ABSTRACT

A splice module for use in fiber optic cable alignment and splicing devices is disclosed, having a multi-piece v-groove module and, in one embodiment, a separately disposable electrode module such that in use only the electrode module needs to be replaced after each fiber optic cable splicing operation. The v-groove module comprises three pieces of nonconductive ceramic material held together with an adhesive. The three pieces provide for a precision v-groove for fiber optic cable alignment during mechanical splicing or fusion splicing. The electrode module includes a nonconductive ceramic with plated electrode circuit and an adhesive for mounting in the v-groove module. The electrode module provides the arc for fusing fiber optic cable and is designed to be user replaceable and inexpensive. Also disclosed is a tool and method for the easy user replacement of the electrode module of the present invention. In addition, the v-groove module may be used for the mechanical alignment of fibers as the basis for a permanent splice.

16 Claims, 4 Drawing Sheets

SPLICE MODULE FOR USE IN FIBER OPTIC CABLE ALIGNMENT AND SPLICING DEVICES

BACKGROUND OF THE INVENTION

1. Field of the Invention

This invention relates generally to a splice element and more particularly to a consumable block for use in alignment and splicing both single and multi-mode single optical cable fibers.

2. Description of the Related Art

Fusion splicing devices have been well known for some time and many of these devices are commercially available. One such device is described in U.S. Pat. No. 5,002,351 to Szanto et al, issued Mar. 26, 1991 entitled Splicer for Optical Fibers. This and other similar devices are equipped with costly, permanent, tungsten electrodes capable of withstanding many repeated uses.

Another such device is described in U.S. Pat. No. 5,146,527 to Mallinson issued Sep. 8, 1992. Mallinson's fusion splicer is designed to receive a consumable ferrule, having a bore through a central longitudinal axis, for accommodating two fiber ends for fusion within. A slot is formed in the ferrule into which permanent electrodes are temporarily inserted for fusing optical fibers positioned within the bore.

U.S. Pat. No. 4,598,974 to Munn et al, issued Jul. 8, 1986 describes an optical fiber connector having integral electrodes. Although Munn's device relates specifically to a connector having a pre-inserted optical fiber stub, it is possible to adapt this design to a fusion sleeve for fusing two unconnected optical fibers. However, it is believed that a limitation of Munn's connector is the cost related to assembling such sleeves that must be kept free of dust, debris and grease. In addition to these restrictions, it is difficult to mass-produce such sleeves because each electrode must be individually inserted into its respective opening in the sleeve, adding to the cost of assembly.

U.S. Pat. No. 5,222,171 to Straus issued Jun. 22, 1993 describes a sleeve similar to Munn's having integral electrodes and axial alignment means. In one embodiment shown in FIG. 10 of the Straus patent two pieces of metal are attached by an adhesive and act as electrodes on either side of tubular member. Each piece of metal has a hole and a transverse hole is formed in the tubular member. Application of electric current produces an arc from the edges of the holes, which fuse fiber ends therebetween. Although the Straus sleeve may work as described, placement of the electrodes in this manner, so that they are essentially parallel to one another on either side of the member, is not a preferred design and is costly to manufacture.

U.S. Pat. No. 5,582,671 to Harman et al issued Dec. 10, 1996 discloses a method of manufacturing a fusion-splicing block for optical fiber splicing. The fusion splicing block is a one-piece consumable fusion block for both aligning the ends of the optical fibers to be spliced and the electrodes used for fusing said optical fibers. The method further discloses manufacturing a plurality of fusion blocks from a single slab of non-conduction material by overlying the non-conduction material with a length of conducting material, bonding the conduction material to the non-conduction material, and cutting the slab into smaller fusion blocks.

U.S. Pat. No. 5,740,301 to Harman et al, issued Apr. 14, 1998 discloses the fusion splicing block with electrodes disposed on planar surface being the product of the method of manufacture of U.S. Pat. No. 5,582,671 disclosed hereinabove.

U.S. Pat. No. 5,717,813 to Harman et al, issued Feb. 10, 1998 discloses an optical fiber splice element that includes a base member having a fusion element for aligning optical fibers for fusion within. A covering member is provided for covering and forming an enclosure with the base member in a closed position. The covering member can be a separate member or alternatively can be in the form of a hinged lid. In all of these teachings the alignment block is manufactured as a single unit. Further the alignment block and the electrodes are manufactured as a single integral unit.

Although the Harman et al inventions works as described, the production of a precise alignment groove in a single piece of non-conducting substrate is difficult and expensive to produce in commercial quantities. Furthermore, each use of the Harman et al inventions requires the replacement of both the electrodes and the alignment block because they are a single integral unit.

Thus, there remains a need for an optical fiber splicing device that is easy and inexpensive to manufacture while at the same time providing for the effective splicing of optical fibers.

OBJECTS OF THE INVENTION

One object of this invention is to provide an inexpensive user replaceable electrode module for use in a splice module for alignment and splicing fiber optic cables.

Another object of this invention is to provide an easily assembled splice module having both an easily replaceable, but reusable v-groove module and an easily replaceable single use electrode module mounted within said reusable v-groove module.

Another object of this invention is to provide the basis of fiber alignment for a permanent mechanical fiber splice.

Yet another object of the invention is to provide a method, and mounting and dismounting tool, for the easy replacement of the electrode module.

SUMMARY OF THE INVENTION

Accordingly, one form of the present invention relates to a splice module for aligning and splicing, preferably fusion splicing, optical fibers resting along a passline thereon, comprising: a v-groove module comprising; a non-conductive base plate having substantially planar top and bottom surfaces, and a notch located substantially in the longitudinal center; a non-conductive first top plate having a substantially planar bottom surface for mounting on the top surface of said base plate, and a mating edge for mating against a second top plate, an angled face adjacent to said mating edge, and a notch located substantially in the longitudinal center; a non-conductive second top plate having a substantially planar bottom surface for mounting on the top surface of said base plate and a mating edge for mating against said first top plate, an angled face adjacent to said mating edge, and a notch located substantially in the longitudinal center; an adhesive layer located between the top surface of said base plate and the bottom surfaces of said first top plate and said second top plate thereby adhesively bonding said first and second top plates to said base plate; an electrode module comprising; a non-conductive base plate having a pair of non-conducting electrode mounts, substantially in the longitudinal center of said base plate, separated by a substantially hour-glass shaped opening, and forming the narrow center portion of said hour-glass shaped opening; a pair of electrodes, each electrode having a electrode tip end and having an other end for contacting a current source, a portion of each electrode overlying the upper surface of one of said electrode mounts in spaced apart relationship across said narrow center portion of said hour-glass opening and the passline, the electrode tips defining an arc region therebetween; and an adhesive layer on the upper surface of said non-conductive base plate on either side of said non-conducting electrode mounts for mounting said electrode module to said v-groove module;

Another form of the invention relates to a splice module for aligning and splicing, preferably by fusing, optical fibers resting along a passline thereon, comprising: a non-conductive v-groove module comprising; a non-conductive base plate having substantially planar top and bottom surfaces, and a notch located substantially in the longitudinal center; a non-conductive first top plate having a substantially planar bottom surface for mounting on the top surface of said base plate, and a mating edge for mating against a second top plate, an angled face adjacent to said mating edge, and a notch located substantially in the longitudinal center; a non-conductive second top plate having a substantially planar bottom surface for mounting on the top surface of said base plate and a mating edge for mating against said first top plate, an angled face adjacent to said mating edge, and a notch located substantially in the longitudinal center; an adhesive layer located between the top surface of said base plate and the bottom surfaces of said first top plate and said second top plate thereby adhesively bonding said first and second top plates to said base plate; and adapted to receive an electrode module, and an electrode module comprising; a non-conductive substrate, at least two portions of conductive material disposed on an outer surface of said non-conductive substrate and adapted for making contact with an operatively associated external current source, and at least two substantially planar conductive electrodes having electrode tips overlaying a layer of the substrate, said at least two substantially planar conductive electrodes being electrically isolated from each other and each electrode being electrically connected to a one of the at least two outer portions, the electrode tips defining an arc region therebetween.

Yet another form of the invention relates to a splice module for aligning and splicing, preferably by fusing, optical fibers resting along a passline thereon, comprising: a non-conductive v-groove module comprising; a non-conductive base plate having substantially planar top and bottom surfaces, and a notch located substantially in the longitudinal center; a non-conductive first top plate having a substantially planar bottom surface for mounting on the top surface of said base plate, and a mating edge for mating against a second top plate, an angled face adjacent to said mating edge, and a notch located substantially in the longitudinal center; a non-conductive second top plate having a substantially planar bottom surface for mounting on the top surface of said base plate and a mating edge for mating against said first top plate, an angled face adjacent to said mating edge, and a notch located substantially in the longitudinal center; an adhesive layer located between the top surface of said base plate and the bottom surfaces of said first top plate and said second top plate thereby adhesively bonding said first and second top plates to said base plate; and adapted to receive an electrode module, and an electrode module comprising; a non-conductive substrate, at least two portions of conductive material disposed on an outer surface of said non-conductive substrate and adapted for making contact with an operatively associated external current source, and at least two substantially planar conductive electrodes having electrode tips overlaying a layer of the substrate, said at least two substantially planar conductive electrodes being electrically isolated from each other, and each electrode being electrically connected to a one of the at least two outer portions, the electrode tips defining an arc region therebetween, means defining through holes in the non-conductive substrate, and at least two plated conductive members in said through holes, each plated conductive member electrically interconnecting at least one of the electrodes with at least one of the portions of conductive material.

Still another form of this invention relates to a splice module for aligning and splicing optical fibers resting along a pass line thereon, comprising: a v-groove module comprising; a base plate having substantially planar top and bottom surfaces; a first top plate having a substantially planar bottom surface for mounting on the top surface of said base plate and a mating edge for mating against a second top plate, and a face having an angle $\Phi$ adjacent to said mating edge; a non-conductive second top plate having a substantially planar bottom surface for mounting on the top surface of said base plate and a mating edge for mating against said first top plate, and a face having an angle $\Phi$ adjacent to said mating edge; and an adhesive layer located between the top surface of said base plate and the bottom surfaces of said first top plate and said second top plate, thereby adhesively bonding said first and second top plates to said base plate, said v-groove module including a groove for aligning and guiding fibers along said passline, whereby a pair of optical fibers may be precisely aligned in said v-groove module and spliced in said v-groove module. Preferably the optical fibers are adapted to be adhesively affixed to said groove or mechanically held firmly in the groove.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

Figure 1:
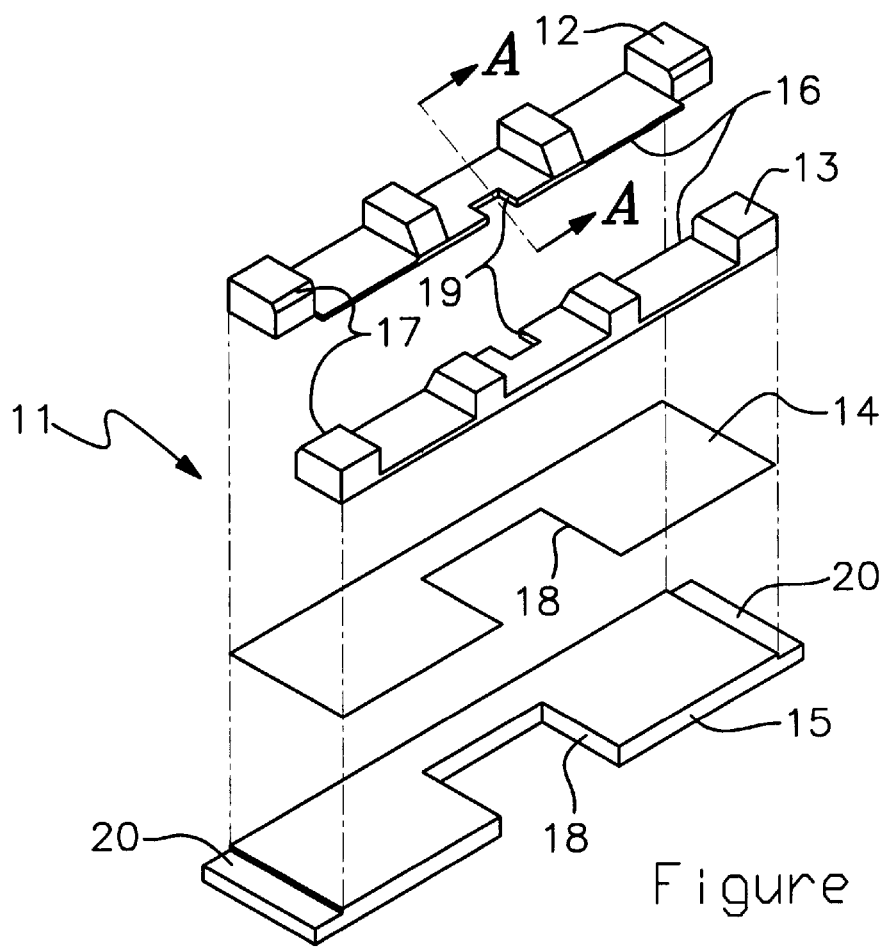
FIG. 1 is an oblique view of the v-groove module of the present invention.

The present invention will be better understood from the specification taken in conjunction with the accompanying drawings in which like reference numerals refer to like parts.

Referring to the drawings in greater detail, and first to FIG. 1 showing a v-groove module 11 comprising a non-conducting substrate of a material such as yttria stabilized zirconium, including a first v-groove module top plate 12, a second v-groove module top plate 13, said top plates having substantially planar bottom surfaces, and a v-groove base plate 15 having substantially planar top and bottom surfaces. The v-groove module top plates 12 and 13 each have a mating edge 16 for mating with each other upon assembly onto v-groove base plate 15. Further, each v-groove module top plate 12 and 13 has an angled face 17 located adjacent to the mating edge 16 which when said v-groove module top plates are mounted on v-groove module base plate 15 the two opposing angled faces 17 define a v-groove passline for positioning optical fibers 51 (FIG. 5) therein. V-groove module base plate 15 further comprises an end portion 20 on each longitudinal end and extending past the ends of v-groove top plates 12 and 13 for mounting the v-groove module 11 in a fiber optic cable fusion splicing device (not shown). V-groove module top plates 11 and 12 are bonded to v-groove base plate 15 by an adhesive layer 14 such as a 0.002-inch thick double sided adhesive tape. The presently preferred adhesive layer 14 is 0.002-inch thick, die cut, VHB double-sided tape manufactured by the 3M Company. The use of a double-sided adhesive tape provides for an even, level layer of adhesive thereby providing for easy alignment of the v-groove module components. V-groove module base plate 15 and adhesive layer 14 have corresponding notches 18 cut into them to allow the insertion of the electrode module 60, and mounting of electrode module base 61 (FIG. 6) into said v-groove base plate 15. Likewise, v-groove top plates 12 and 13 have corresponding notches 19 cut into them to allow for the insert of the electrode posts 62 and electrodes 63 (FIG. 6) through v-groove top plates 12 and 13. The notches 19 are further described as being sized so as to allow only electrode posts 62 and electrodes 63 of electrode module base 61 (FIG. 6) to pass through.

Figure 2:
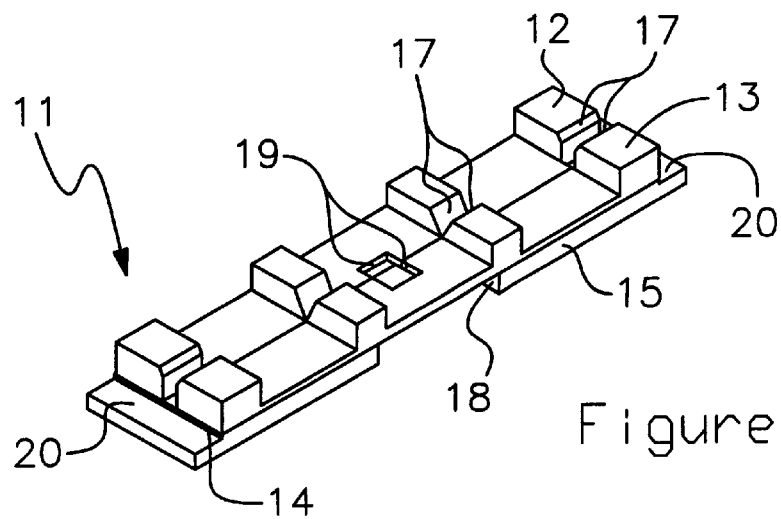
FIG. 2 is an oblique view of the assembled v-groove module of the present invention.

Referring now to FIG. 2 an assembled v-groove module is shown comprising v-groove module base plate 15 having end portions 20 on each longitudinal end, and notch 18, adhesive layer 14 located between the upper surface of v-groove module base plate 15 and the bottom surfaces of v-groove module top plates 12 and 13. V-groove module top plates 12 and 13 each having a mating edge 16 mated against each other, angled face 17 facing each other and defining a v-groove for receiving an optical fiber, and notch 19 each aligned with the other so as to define an opening through which electrode posts 62 and electrodes 63 (FIG. 6) may pass.

Figure 3:
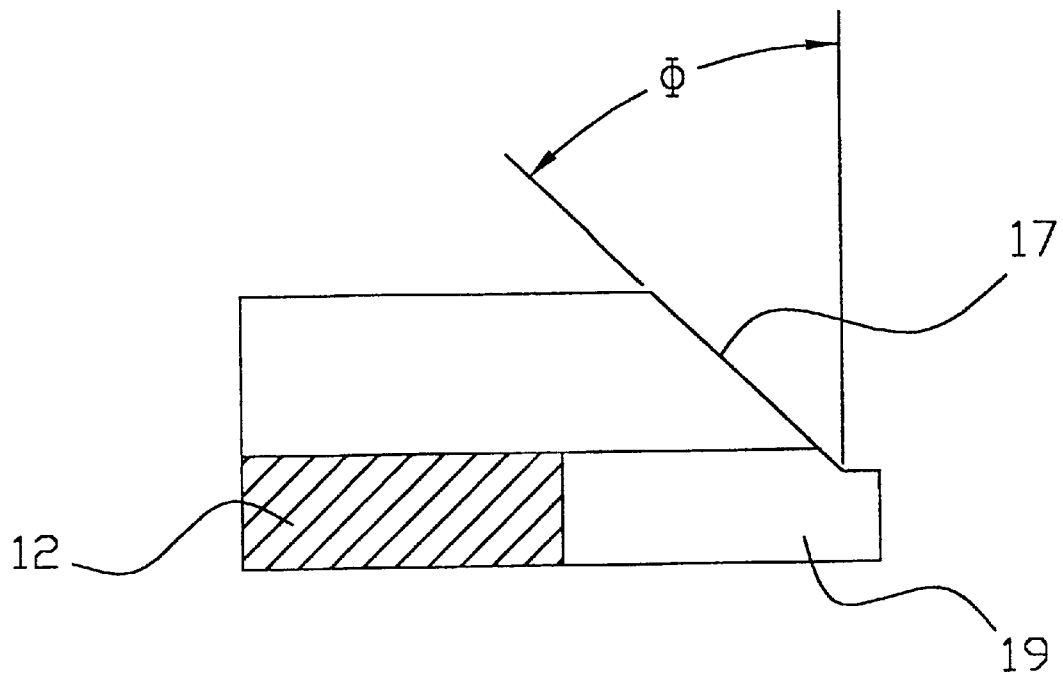
FIG. 3 is a plan view through line A—A of v-groove module plate 11 of FIG. 1.

Referring now to FIG. 3 a plan view of right v-groove top plate 12 through line A—A showing notch 19, and angled face 17, adjacent to mating edge 16, and having an angle Φ. Preferably angle Φ is 35°±1°.

Figure 4:
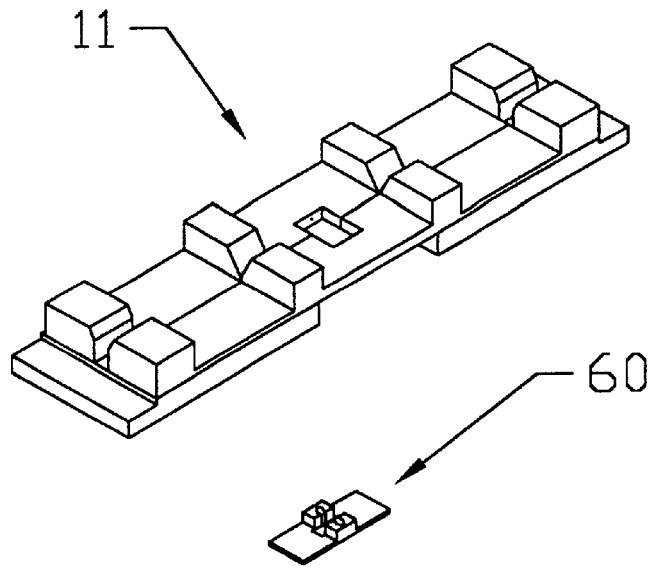
FIG. 4 is an oblique view of the v-groove module and the electrode module of the present invention.

Referring now to FIG. 4 an oblique view showing the mounting relationship of v-groove module 11 and electrode module 60 of the present invention. In addition, FIG. 4 illustrates the mounting of the electrode module into the v-groove module from the bottom of said v-groove module.

Figure 5:
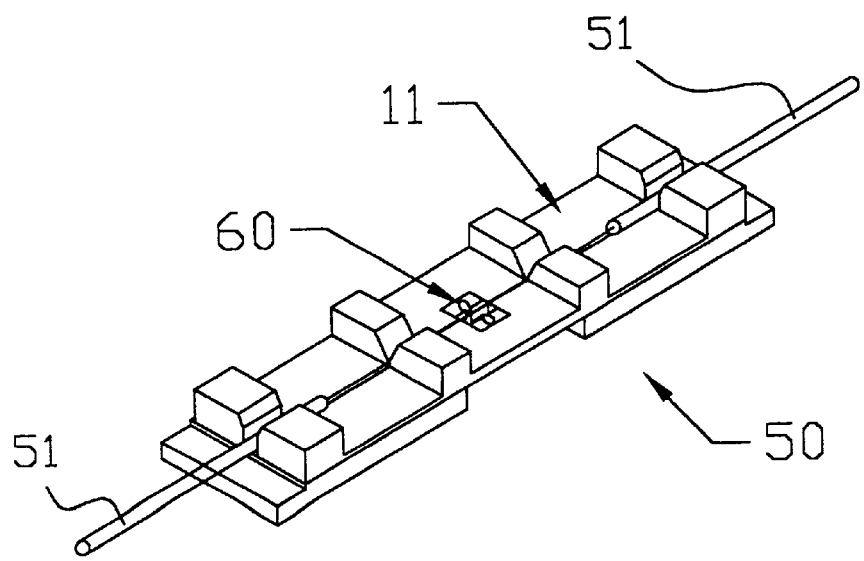
FIG. 5 is an oblique view of the fusion splicing block of the present invention showing two fiber optic fibers mounted for fusing.

Referring now to FIG. 5 an oblique view showing the fully assembled fusion splice module 50 comprising assembled v-groove module 11 and mounted electrode module 60 as well as a optic fiber 51 mounted in the v-groove passline for splicing.

Figure 6:
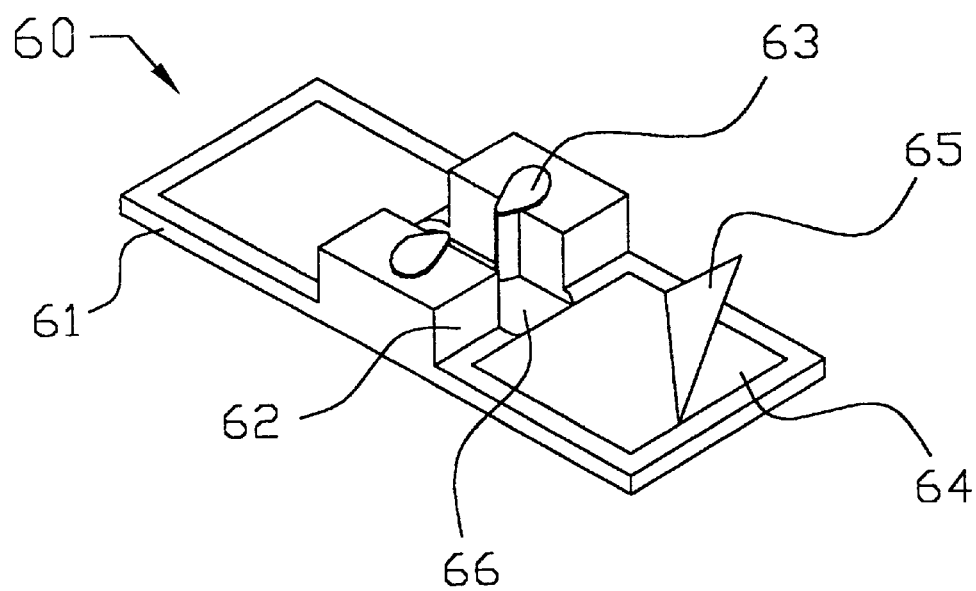
FIG. 6 is an oblique view of the electrode module of the present invention.

Referring now to FIG. 6 an oblique view showing an electrode module 60 comprising, a non-conductive base plate 61 having substantially planar top and bottom surfaces, and having elevated non-conductive electrode mounts 62 containing electrodes 63 therein located substantially in the center of the upper surface of said non-conductive base plate 61. Elevated non-conductive electrode mounts 62 and electrodes 63 are separated by a substantially hour-glass shaped opening 66 where said electrodes are located on either side of the narrow center of said hour-glass shaped opening. The electrode module base plate 61 and elevated electrode mounts 62 are preferably comprised of 96% aluminum oxide ceramic. The upper substantially planar surface of electrode module base plate 61, on either side of elevated electrode mounts 62, has an adhesive layer applied thereto to allow for adhesively mounting said electrode module 60 to the v-groove module 11. The preferred adhesive layer is 9416 High Tack/Low Tack D/C Tissue Tape manufactured by the 3M Company. This preferred adhesive layer does not leave any adhesive residue behind and therefore provides a clean flat surface for mounting subsequent electrode modules 60. The electrodes 63, are electrically isolated from one another, and comprise a preferably tear drop shaped electrode on the top surface of elevated electrode mount 62 electrically connected to contact pad 81 (FIG. 8) via electrical conductor plated interior walls of an opening 82 (FIG. 8) for connection to an electrical current source (not shown). The preferred electrical conductor material for electrodes 63 is copper. When mounted the v-groove formed by angled faces 17 of v-groove module 11 and the hour-glass shaped opening 66 in the electrode module 60 form a passline for positioning a fiber optic cable for fusing.

Figure 9:
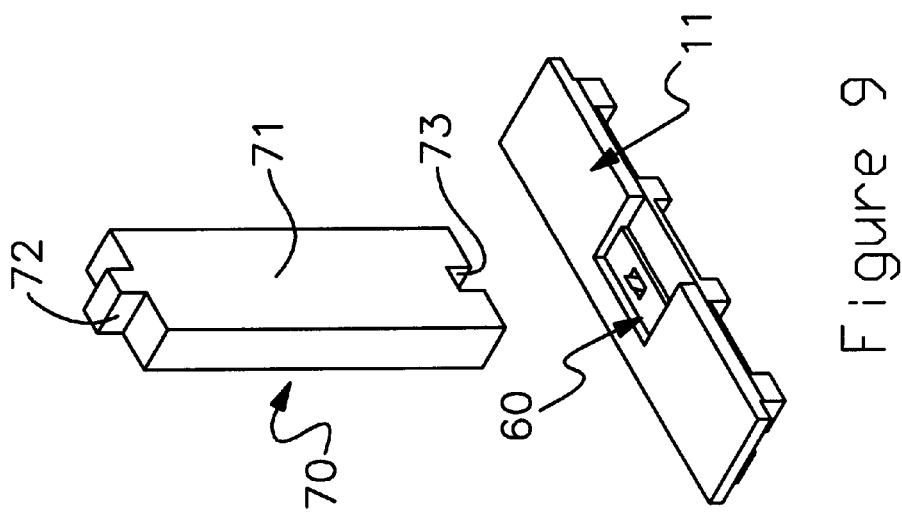
FIG. 9 is an oblique bottom view of the fusion splicing block and electrode module mounting tool of the present invention.
Figure 8:
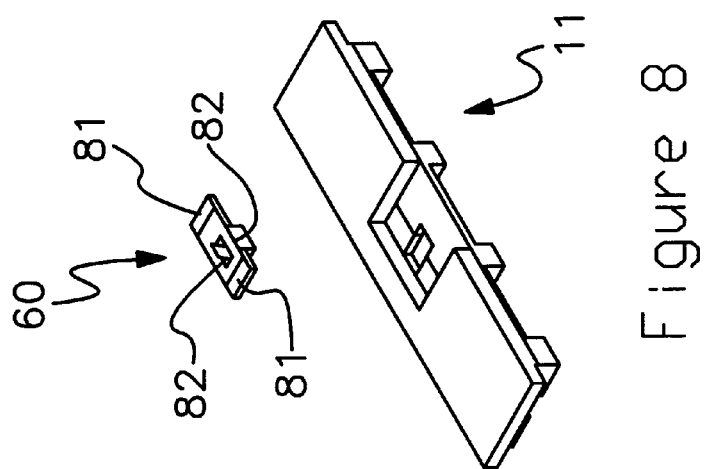
FIG. 8 is an oblique bottom view of the placement of the electrode module in the v-groove module of the present invention.
Figure 7:
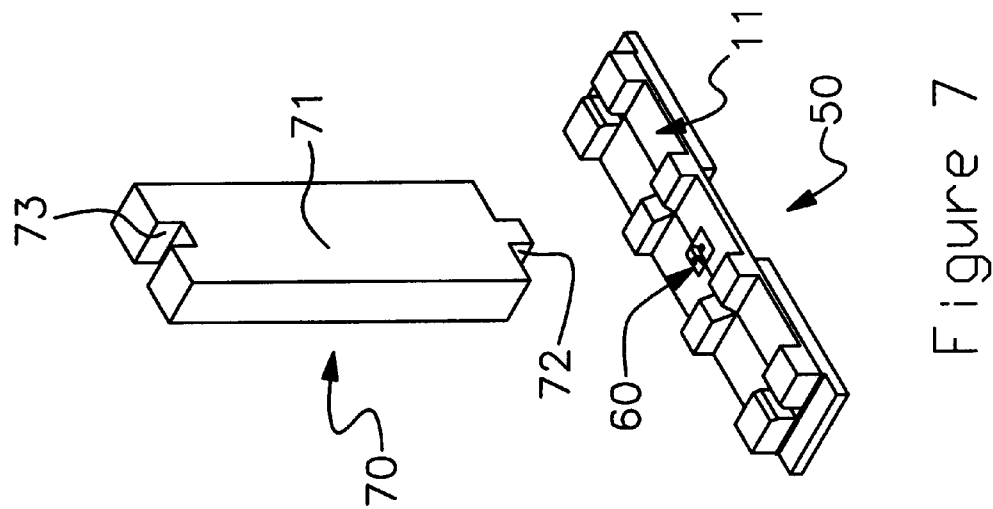
FIG. 7 is an oblique view of the fusion splicing block and an electrode module removing tool of the present invention.

In practice, and referring to FIGS. 7, 8, and 9, the following detailed description illustrates how to mount the electrode module into the v-groove module to provide the complete splice module for use in fiber optic cable fusion splicing devices. Referring now to FIG. 7 there is shown a splice module 50 comprising v-groove module 11 having a used electrode module 60 mounted therein. Also shown is mounting/dismounting tool 70 comprising a generally planar rectangular body 71 having located at one longitudinal end dismounting stud 72, and located at the other longitudinal end mounting notch 73. Used electrode module 60 is dismounted from v-groove module 11 by placing the dismounting stud 72 of mounting/dismounting tool 70 on the top of electrode module 60 and pushing downward on said mounting/dismounting tool 70, thereby pushing said electrode module out the bottom of said v-groove module 11.

To mount a new electrode module 60, first the paper backing 65 is removed from each of the adhesive layers 64. The electrode module 60 is then inserted through the notches 18 and 19 of v-groove module 11 from the bottom of said v-groove module 11 and seated in position by placing the mounting/dismounting tool 70, mounting notch end 73, on the bottom of electrode module 60 and forcing said electrode module 60 into v-groove module 11. The exposed adhesive layer 64 fixedly attaching the two modules together.

The v-groove module 11 with or without notch 19 could be used to precisely align optic fibers 51 forming a basis for a permanent mechanical splice with or without the use of fusion element 60 and without disposing of v-groove module 11 after the splice has been completed. In this case, one would need to use a mechanical means to hold the fibers 51 in the v-groove such as, for example, by gluing the fibers 51 to angled faces 17 which define the v-groove pass line or mechanicaly pressing the fibers into the groove.

The invention has been described with reference to the preferred embodiments. Obviously modifications and alterations will occur to others upon the reading and understanding of this specification. It is our intention to include all such modifications and alterations insofar as they fall within the scope of the appended claims or the equivalents thereof.

What is claimed is:

1. A fusion splice module for fusing optical fibers resting along a passline thereon, comprising:
   a) a v-groove module comprising;
      a non-conductive base plate having substantially planar top and bottom surfaces, and a notch located substantially in the longitudinal center;
      a non-conductive first top plate having a substantially planar bottom surface for mounting on the top surface of said base plate, and a mating edge for mating against a second top plate, a face having an angle $\Phi$ adjacent to said mating edge, and a notch located substantially in the longitudinal center;
      a non-conductive second top plate having a substantially planar bottom surface for mounting on the top surface of said base plate and a mating edge for mating against said first top plate, a face having an angle $\Phi$ adjacent to said mating edge, and a notch located substantially in the longitudinal center; and
      an adhesive layer located between the top surface of said base plate and the bottom surfaces of said first top plate and said second top plate thereby adhesively bonding said first and second top plates to said base plate; and
   b) an electrode module comprising;
      a non-conductive base plate having a pair of non-conducting electrode mounts, substantially in the longitudinal center of said base plate, separated by a substantially hour-glass shaped opening, and forming the narrow center portion of said hour-glass shaped opening;
      a pair of electrodes, each electrode having an electrode tip end and having an other end for contacting a current source, a portion of each electrode overlying the upper surface of one of said electrode mounts in spaced apart relationship across said narrow center portion of said hour-glass opening and the passline, the electrode tips defining an arc region therebetween; and
      an adhesive layer on the upper surface of said non-conductive base plate on either side of said non-conducting electrode mounts for mounting said electrode module to said v-groove module.

2. The fusion splice module for fusing optical fibers as claimed in claim 1, wherein said v-groove module comprises essentially yttria stabilized zirconium, and said non-conductive portion of said electrode module comprises essentially 96% aluminum oxide ceramic.

3. The fusion splice module for fusing optical fibers as claimed in claim 2, wherein the electrical conduction path comprises a conductive lining on the interior walls of an opening in the non-conducting electrode mounts, the conductive lining interconnecting the electrode tip portion of each of said pair of electrodes with the contact pad via the conducting path.

4. The fusion splice module for fusing optical fibers as claimed in claim 1, wherein an electrical conducting path connecting the electrode tip end of each said pair of electrodes with the other end of each of said pair of electrodes, said other end of each of said pair of electrodes forming an electrical contact pad.

5. The fusion splice module for fusing optical fibers as claimed in claim 1, wherein the portion of each of the pair of electrodes overlying the surface of the non-conducting electrode mounts is bonded to said electrode mounts.

6. The fusion splice module for fusing optical fibers as claimed in claim 1, wherein the v-groove module includes a groove for aligning and guiding the fibers along said passline.

7. The fusion splice module for fusing optical fibers as claimed in claim 1, wherein the electrode tip end of each of said pair of electrodes has a smaller cross section than the other end of each of said pair of electrodes for contacting the current source, the pair of electrode tip ends defining an arc gap for creating a plasma arc at the gap for fusing the optical fibers in the present of a current across the pair of electrodes sufficient for fusion.

8. The fusion splice module for fusing optical fibers as claimed in claim 7, wherein said pair of electrodes is printed on the electrode mounts.

9. The fusion splice module for fusing optical fibers as claimed in claim 7, wherein said pair of electrodes is glued on the electrode mounts.

10. The fusion splice module for fusing optical fibers as claimed in claim 7, wherein said pair of electrodes is plated on the electrode mounts.

11. The fusion splice module for fusing optical fibers as claimed in claim 1, wherein said angle $\Phi$ is substantially about 35°.

12. A fusion splice module for fusing optical fibers resting along a passline thereon, comprising:
   a) a non-conductive v-groove module adapted to receive an electrode module comprising;
      a non-conductive base plate having substantially planar top and bottom surfaces, and a notch located substantially in the longitudinal center;
      a non-conductive first top plate having a substantially planar bottom surface for mounting on the top surface of said base plate, and a mating edge for mating against a second top plate, a face having an angle $\Phi$ adjacent to said mating edge, and a notch located substantially in the longitudinal center;
      a non-conductive first top plate having a substantially planar bottom surface for mounting on the top surface of said base plate and a mating edge for mating against said first top plate mating edge, and a notch located substantially in the longitudinal center; and
      an adhesive layer located between the top surface of said base plate and the bottom surfaces of said first top plate and said second top plate, thereby adhesively bonding said first and said second top plates to said base plate; and
   b) an electrode module comprising;
      a non-conductive substrate;
      at least two portions of conductive material disposed on an outer surface of said non-conductive substrate and adapted for making contact with an operatively associated external current source; and
      at least two substantially planar conductive electrodes having electrode tips overlaying a layer of the substrate, said at least two substantially planar conductive electrodes being electrically isolated from each other and each electrode being electrically connected to a one of the at least two outer portions, the electrode tips defining an arc region therebetween.

13. A fusion splice module for fusing optical fibers resting along a passline thereon, comprising:
   a) a non-conductive v-groove module adapted to receive an electrode module comprising;
      a non-conductive base plate having substantially planar top and bottom surfaces, and a notch located substantially in the longitudinal center;

a non-conductive first top plate having a substantially planar bottom surface for mounting on the top surface of said base plate and a mating edge for mating against a second top plate mating edge, a face having an angle $\Phi$ adjacent to said mating edge, and a notch located substantially in the longitudinal center;

a non-conductive second top plate having a substantially planar bottom surface for mounting on the top surface of said base plate and a mating edge for mating against said first top plate mating edge, a face having an angle $\Phi$ adjacent to said mating edge, and a notch located substantially in the longitudinal center; and an adhesive layer located between the top surface of said base plate and the bottom surfaces of said first top plate and said second top plate, thereby adhesively bonding said first and second top plates to said base plate;

b) an electrode module comprising;

a non-conductive substrate;

at least two portions of conductive material disposed on an outer surface of said non-conductive substrate and adapted for making contact with an operatively associated external current source; and at least two substantially planar conductive electrodes having electrode tips overlaying a layer of the substrate, said at least two substantially planar conductive electrodes being electrically isolated from each other, and each electrode being electrically connected to a one of the at least two outer portions, the electrode tips defining an arc region therebetween;

c) means defining through holes in the non-conductive substrate; and d) at least two plated conductive members in said through holes, each plated conductive member electrically interconnecting at least one of the electrodes with at least one of the portions of conductive material.

14. A splice module for aligning and splicing optical fibers resting along a pass line thereon, comprising:

a) a v-groove module comprising;

a base plate having substantially planar top and bottom surfaces;

a first top plate having a substantially planar bottom surface for mounting on the top surface of said base plate and a mating edge for mating against a second top plate, and a face having an angle $\Phi$ adjacent to said mating edge;

a second top plate having a substantially planar bottom surface for mounting on the top surface of said base plate and a mating edge for mating against said first top plate, and a face having an angle $\Phi$ adjacent to said mating edge; and an adhesive layer located between the top surface of said base plate and the bottom surfaces of said first top plate and said second top plate, thereby adhesively bonding said first and second top plates to said base plate, said v-groove module including a groove for aligning and guiding fibers along said passline, whereby a pair of optical fibers may be precisely aligned in said v-groove module, thereby enabling a mechanical splice of the fibers.

15. The fusion splice module for aligning and splicing optical fibers as claimed in claim 14, wherein the optical fibers are adapted to be mechanically affixed to said groove.

16. The fusion splice module for aligning and splicing optical fibers as claimed in claim 14, wherein the fibers are glued to said groove.

* * * * *